(12) United States Patent
Christ et al.

(10) Patent No.: US 10,339,639 B2
(45) Date of Patent: Jul. 2, 2019

(54) METHOD AND SYSTEM OF CALIBRATING A MULTISPECTRAL CAMERA ON AN AERIAL VEHICLE

(71) Applicant: KONICA MINOLTA LABORATORY U.S.A., INC., San Mateo, CA (US)

(72) Inventors: John Randall Christ, Santa Clara, CA (US); Po-Chieh Hung, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 184 days.

(21) Appl. No.: 15/025,137

(22) PCT Filed: Sep. 24, 2014

(86) PCT No.: PCT/US2014/057102
§ 371 (c)(1),
(2) Date: Mar. 25, 2016

(87) PCT Pub. No.: WO2015/088618
PCT Pub. Date: Jun. 18, 2015

(65) Prior Publication Data
US 2016/0232650 A1   Aug. 11, 2016

Related U.S. Application Data

(60) Provisional application No. 61/882,842, filed on Sep. 26, 2013.

(51) Int. Cl.
| | |
|---|---|
| *H04N 7/18* | (2006.01) |
| *G06T 5/00* | (2006.01) |
| *G01J 3/28* | (2006.01) |
| *G06T 7/80* | (2017.01) |
| *H04N 5/33* | (2006.01) |
| *H04N 17/00* | (2006.01) |

(Continued)

(52) U.S. Cl.
CPC .............. *G06T 5/007* (2013.01); *G01J 3/28* (2013.01); *G01J 3/2823* (2013.01); *G06T 7/80* (2017.01);
(Continued)

(58) Field of Classification Search
CPC .... G06T 5/007; G06T 7/80; G01J 3/28; G01J 3/2823
(Continued)

(56) References Cited

U.S. PATENT DOCUMENTS

| | | | |
|---|---|---|---|
| 5,602,543 A | 2/1997 | Prata et al. | |
| 2009/0326816 A1* | 12/2009 | Park .................... | G01C 21/165 701/501 |

(Continued)

OTHER PUBLICATIONS

International Search Report (PCT/ISA/210) dated Jun. 16, 2015, by the United States Patent and Trademark Office as the International Searching Authority for International Application No. PCT/US2014/057102.

(Continued)

*Primary Examiner* — Farzana Hossain
(74) *Attorney, Agent, or Firm* — Buchanan Ingersoll & Rooney PC

(57) ABSTRACT

A method and system of calibrating multispectral images from a camera on an aerial vehicle, the method including: capturing multispectral images of an area at a plurality of intervals with a multispectral imaging camera; simultaneously or at an arbitrary time capturing sunlight radiance data for each of the captured images; correlating the images with the sunlight radiance data; and calibrating the multispectral images based on the sunlight radiance data to normalize the multispectral images to one or more previous images of the area.

14 Claims, 7 Drawing Sheets

(51) Int. Cl.
    *G01J 1/42* (2006.01)
(52) U.S. Cl.
    CPC ............... *G01J 2001/4266* (2013.01); *G06T 2207/10036* (2013.01); *H04N 5/332* (2013.01); *H04N 17/002* (2013.01)
(58) Field of Classification Search
    USPC ...................................................... 348/148
    See application file for complete search history.

(56) References Cited

U.S. PATENT DOCUMENTS

| 2010/0002947 | A1 | 1/2010 | Riley et al. | |
|---|---|---|---|---|
| 2010/0283637 | A1 | 11/2010 | Franko et al. | |
| 2013/0004065 | A1 | 1/2013 | Ma | |
| 2014/0163772 | A1* | 6/2014 | Vian | G05D 1/0094 701/2 |
| 2015/0248584 | A1* | 9/2015 | Greveson | G06K 9/00476 382/113 |

OTHER PUBLICATIONS

Written Opinion (PCT/ISA/237) dated Jun. 16, 2015, by the United States Patent and Trademark Office as the International Searching Authority for International Application No. PCT/US2014/057102.
Patent Examination Report No. 1 dated Aug. 9, 2016 by the Australian Patent Office in corresponding Australian Patent Application No. 2014360786 (4 pages).

* cited by examiner

METHOD AND SYSTEM OF CALIBRATING A MULTISPECTRAL CAMERA ON AN AERIAL VEHICLE

RELATED APPLICATION(S)

The present application claims priority under 35 U.S.C. 119 to U.S. Provisional Patent Application No. 61/882,842, filed on Sep. 26, 2013, the entire content of which is hereby incorporated by reference.

FIELD

The present application relates to a method and system of calibrating a multispectral camera on an unmanned or manned aerial vehicle

BACKGROUND

Historically, multispectral imaging has been done using satellites and manned aircraft for determining the health of vegetation for agricultural use. However, the use of these technologies is expensive.

Current aerial vehicle multispectral imaging requires ground based radiance images to be taken simultaneously with multispectral images to normalize sunlight effects on multispectral readings. Multispectral images can be affected by the viewing angle, sun zenith angle, visibility of the atmosphere and by cloud cover over the field.

The current ground based calibration methods have several issues, which include that the reflectance panels are costly, heavy, and are easily soiled or scratched. In addition, the current ground based calibration methods do not accurately measure sunlight radiance levels simultaneously with the multispectral images.

Alternatively, a single radiance sensor can be placed in the field when the multispectral imaging is occurring, but this has the problem of only measuring radiance at one place in the field. For example, this can be inaccurate because clouds moving over the field while the multispectral imaging is occurring do not shade the multispectral image uniformly over the field. Images captured by the multispectral camera may be shaded when the field sensor is not shaded and vice versa.

U.S. Patent Publication No. 2013/0004065 A1 describes an aerial image cloud detection method using false color pixels. Multiple images used to detect shadow area from cloud but not combined with calibration.

U.S. Patent Publication No. 2010/0283637 A1 describes a cloud detection using LIDAR, replacement with terrain image. The target is in-flight entertainment in airplanes.

SUMMARY

In consideration of the above issues, it would be desirable to have a method and system, which is accurate and at a lower cost than existing systems, and which includes the ability to capture and store radiance images nearly real-time on the aerial vehicle time-synced and labeled simultaneously with the multispectral images.

In accordance with an exemplary embodiment, a method of calibrating multispectral images from a camera on an aerial vehicle is disclosed, the method comprising: capturing multispectral images of an area at a plurality of intervals with a multispectral imaging camera; simultaneously or at an arbitrary time, capturing sunlight radiance data for each of the captured images; correlating the images with the sunlight radiance data; and calibrating the multispectral images based on the sunlight radiance data to normalize the multispectral images to one or more previous (or succeeding) images of the area.

In accordance with an exemplary embodiment, a system for calibrating multispectral images from a camera on an aerial vehicle is disclosed, the system comprising: an aerial vehicle configured to: capture multispectral images of an area at a plurality of intervals with a multispectral imaging camera; simultaneously or at an arbitrary time, capture sunlight radiance data for each of the captured images; and a computer configured to: correlate the images with the sunlight radiance data; and calibrate the multispectral images based on the sunlight radiance data to normalize the multispectral images to one or more previous (or succeeding) images of the area. For example, sunlight radiance can be captured at a predetermined interval, triggered by positioning system, triggered by computer or manual remote operation using a handheld radio control in the case of an unmanned aerial vehicle or a local manual triggering mechanism in the case of a manned aerial vehicle.

It is to be understood that both the foregoing general description and the following detailed description are exemplary and explanatory and are intended to provide further explanation of the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE PREFERRED EMBODIMENTS

Figure 1:
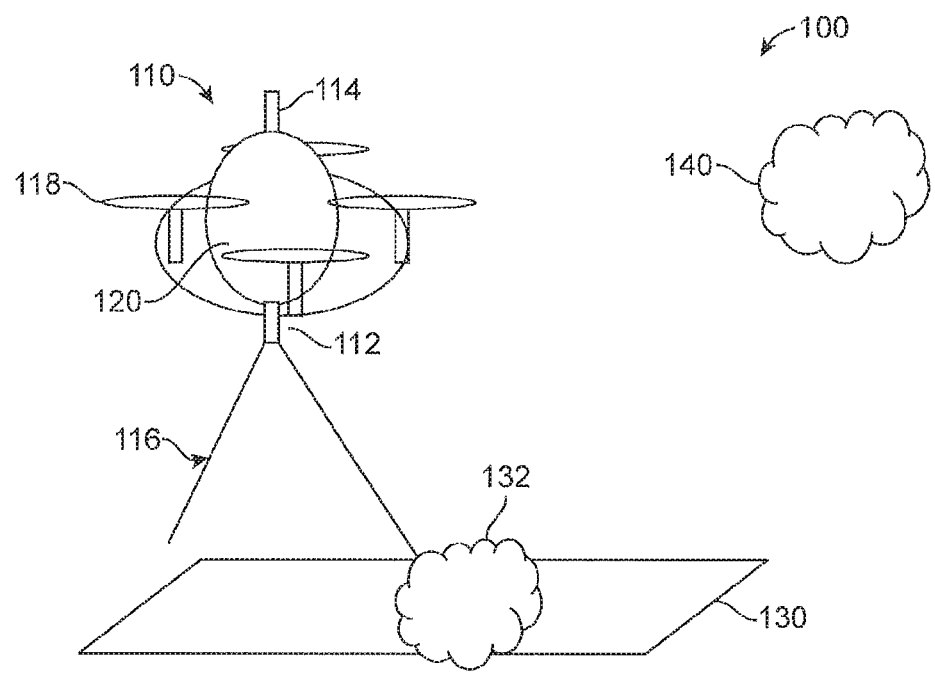
FIG. 1 is an illustration of a system of calibrating a multispectral camera on an aerial vehicle in accordance with an exemplary embodiment.
Figure 1:
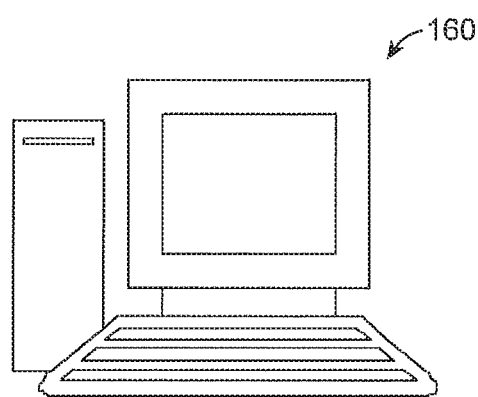

FIG. 1 is an illustration of a system 100 of calibrating a multispectral camera 112 on an aerial vehicle 110 in accordance with an exemplary embodiment. As shown in FIG. 1, the camera 110 can includes a multispectral camera (or sensor) 112, which captures images of a field of crops (or surface area) 130 at set intervals, which can be used to determine the health status of the crops 130. It can be appreciated that in addition to agricultural crops 130, the method and system as disclosed herein can be used for monitoring and detection of ponds, including algae ponds, pollution of the sea, red tide of the sea, tracking movement of animals, for example, herds of animals, and/or monitoring of forests including timber. In addition, the aerial vehicle 110 an include both fixed winged (not shown) and/or rotary wing vehicles 118.

In accordance with an exemplary embodiment, the system and methods as disclosed can be used for generating an index, which is not necessarily confined to Normalized Difference Vegetation Index (NDVI) but other indexes such as fraction of Photosynthetically Active Radiation (fAPAR), Leaf Area Index (LAI), Enhanced Vegetation Index (EVI), Soil Plant Analysis Development (SPAD) as well. In accordance with an exemplary embodiment, the aerial vehicle 110 is an unmanned aerial vehicle (UAV) 120. Alternatively, in accordance with an exemplary embodiment, the aerial vehicle 110 can be a manned aerial vehicle.

As shown in FIG. 1, the multispectral camera or sensor 112 is preferably pointed towards the crops 130 to be measured having a corresponding field of view 116. In accordance with an exemplary embodiment, a pivoted support, such as a gimbal mount can be used to keep the camera 110 oriented towards the crops 130 when the aerial vehicle tilts. Image distortion and orientation can be corrected by image processing, also. In accordance with an exemplary embodiment, the aerial vehicle can also be equipped with a solar radiation sensor 114, which can be mounted on an upper portion of the aerial vehicle 110.

In accordance with an exemplary embodiment, the solar radiation sensor (or radiance sensor) 114 can include an electronic trigger (not shown), which causes the radiance sensor 114 to capture sunlight radiance simultaneously or at an arbitrary time with respect to the multispectral sensor 112. For example, the trigger can be remotely controlled using the autopilot output trigger onboard the aerial vehicle. In accordance with an exemplary embodiment, time stamps are stored with each multispectral image and corresponding sunlight radiance image. The captured images can then be correlated during image processing after the aircraft has landed using a computer 160 having a processor and memory module. The computer 160 preferably includes accordance includes a processor and one or more memories for storing software programs and data. The computer 160 can also include a graphical user interface for viewing images captured by the aerial vehicle 110.

In addition, the aerial vehicle 110 preferably includes a positioning system, which records locational information and altitude information over the surface with each image for georeferencing and image stitching purposes after the aerial vehicle or aircraft 110 has landed. For example, in accordance with an exemplary embodiment, the positioning system can be a Global Positioning System (GPS), WiFi, or a ground based system such as that developed by Locata Corporation. Trilateration or triangulation methods may be used to get more accurate positioning information when several land based nodes are used with known locations. In accordance with an exemplary embodiment, since storage space can be a limited quantity on the aerial vehicle 110, the image storage format is preferably optimized using known methods.

In accordance with an exemplary embodiment, multispectral images can be stored as bands, with each band representing a wavelength of light. For example, a 480 nm "blue" band, a 530 nm "green" band, a "red" band of 650 nm, a "near infrared" band of 930 nm, and so forth.

In accordance with an exemplary embodiment, a method and system of calibration is disclosed, which is configured to adjust measurements because of the effect of cloud cover on the multispectral reading. As shown in FIG. 1, one or more clouds (or cloud cover) 140 can cast a shadow 132 onto the field of crops 130. In addition, for example, cloud cover 140 reflects red light and scatters infrared light. In addition, water clouds and clouds 140 containing ice crystals reflect and scatter light differently, which can cause multispectral readings to fluctuate when cloud cover is present.

In accordance with an exemplary embodiment, calibration data can consist of curves describing the effect of different sunlight radiance levels on different spectral characteristics of the multispectral sensor. The curves can be either linear or nonlinear in nature, and can have different curves for each spectral band used in the multispectral reading. For example, absolute radiometric calibration of the multispectral sensor can be performed in a light controlled laboratory setting using an integrating sphere uniform light source. In addition, a lens vignetting correction can be performed using a flat field correction method with look up tables. For example, in accordance with an exemplary embodiment, calibration curves can be generated for each multispectral sensor, or alternatively, the same model or manufacturing lot can have similar characteristics such that calibration curves only need to be generated once for an entire lot or model of sensor.

In addition, periodic calibration can be used to update the calibration curves, if the multispectral sensor characteristics change as the sensor ages. For example, field radiometric calibration can be performed either using white reflectance areas on the aerial vehicle itself in the field of view of the multispectral camera, or can be performed using a sunlight radiance sensor. In accordance with an exemplary embodiment, the calibration data can be used to correct the absolute pixel values from the sensor to normalized values that can be compared to other sensor values, or values taken from previous or future flights from the same sensor.

In accordance with an exemplary embodiment, farmers frequently need to know changes in crop health during the same growing season, or changes for crop health for a field over several growing seasons. For example, this information can be helpful to detect long term trends in fertilizer concentrations, insects, water stress, animal damage, lodging, and other factors for planning purposes.

Figure 5:
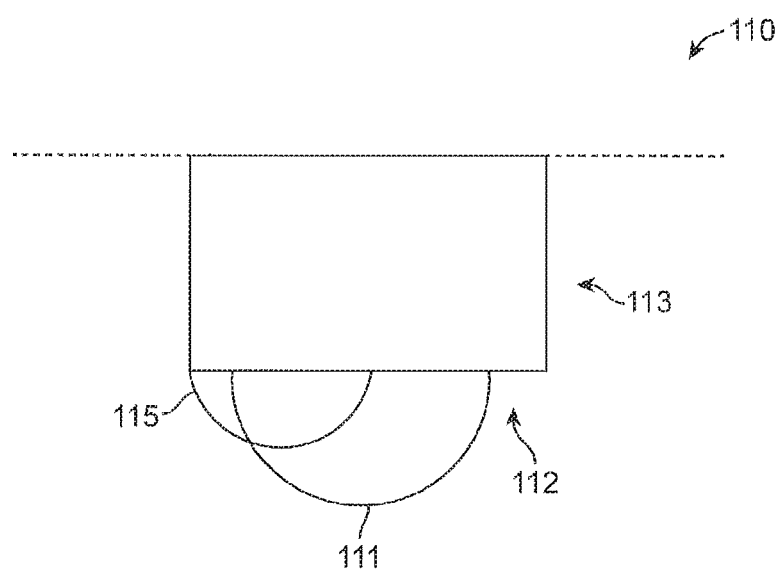
FIG. 5 is an illustration of a multispectral camera having a solar radiance sensor in the form of an optical fiber in accordance with an exemplary embodiment.

In accordance with an exemplary embodiment, the disclosure addresses issues of obstruction of sunlight from cloud cover 140 that is between the aerial vehicle 110 and the sun. In accordance with an exemplary embodiment, the calibration data can be used to correct the raw data readings from the multispectral sensor or camera 112 for the ambient sunlight that is falling on the area of land, for example, a crop 130 to be measured. The multispectral sensor or camera 112 preferably includes an optical lens 111 and a sensor 113 (FIG. 5). In accordance with an exemplary embodiment, the calibration data can be captured using the solar irradiance sensor 114 or by using a white reflectance area in the field of view 116 of the multispectral sensor or camera 112 as described below. In accordance with an exemplary embodiment, the disclosure does not consider effects from ground based obstacles such as shadows from power poles, irrigation systems, or trees because these objects create shadows that are between the aerial vehicle and the crop to be sensed.

In accordance with an exemplary embodiment, compensation of the data obtained by the aerial vehicle can be performed by normalizing the raw values from the multispectral sensor based on the sun intensity through clouds, haze, and fog during sensing. For example, if the day is sunny and the sun is directly overhead the aerial vehicle during sensing, the multispectral sensor will receive the maximum values from the crop. For example, assuming the maximum pixel value is 255, and the minimum pixel value can be zero (0). If the multispectral sensor receives the raw values 120 in the 530 nm band, 130 in the 650 nm band, and 200 in the 930 nm band. In accordance with an exemplary embodiment, the solar irradiance sensor 114 can be used for calibration, and values received by the radiance sensor can be 160 for the 480 nm band, 240 for the 530 nm band, 220 for the 650 nm band, and 205 for the 930 nm band. Since this is the maximum amount of sunlight that can reach the solar irradiance sensor, no calibration is needed.

However, for a cloudy, hazy, or foggy day, for example, the multispectral sensor can receive the raw values 80 in the 530 nm band, 110 in the 650 nm band, and 180 in the 930 nm band. For this example, a solar irradiance sensor 114 for calibration can be used, and values received by this sensor can be 114 for 480 nm band, 170 for the 530 nm band, 190 for the 650 nm band, and 165 for the 930 nm band. In accordance with an exemplary embodiment, these values need to be calibrated to match those of the sunny day reading, so the calibration curve entry for the 530 nm band solar irradiance value of 170 calls for the multispectral band raw value for the 530 nm band to be adjusted by: 240/170=1.412×(80(multispectral raw value for 530 nm band)*1.412=112), the 650 nm band is adjusted by: 220/190=1.15×(110 (multispectral raw value for 650 nm band)*1.15=127), and the 930 nm band is adjusted by: 205/165=1.24×(180 (multispectral raw value for 930 nm band)*1.24=223). Although, this example is a simple linear compensation, nonlinear curves can be used based on laboratory and field irradiance experiments. In accordance with an exemplary embodiment, in case of a hazy day, for example, the calibration can be adjusted by changing the flight height over the surface.

In accordance with an exemplary embodiment, different curves can be used based on conditions, such as sunny day with sun low on the horizon, sunny day with sun overhead, different times of the year, cloudy days, hazy days and so forth for more accuracy, depending on the accuracy required and the available space in the processing unit of the camera 112.

In accordance with an exemplary embodiment, an exemplary embodiment for calibration is to have a white area in the field of view of the multispectral imager that is always "seen", for example, visible by the multispectral imager. When each image is processed, the relative radiance level from the sun can be used to calibrate the image. For example, the white area can be a flat planar board or a dome shaped object. In the latter case, the sun radiance from direct and diffuse sunlight for certain angles can be estimated simultaneously. For example, in case of rotary powered aerial vehicles (helicopters, quadcopters, octocopters, hexacopters, and the like) that have landing gear, part of the tubular landing gear can be painted white if it is in the field of view of the camera and can be used for the white area.

In accordance with an exemplary embodiment, for example, a 4 to 6 channel radiance sensor 114 can be used to detect sunlight radiance on the aerial vehicle 110 while multispectral imaging is occurring. The radiance sensor 114 can be pointed upwards from the aerial vehicle 110 to capture direct and indirect sunlight. The detection channels of this radiance sensor 114 can be tuned to detect the same wavelengths as the multispectral sensor. For example, wavelengths of 480 nm, 530 nm, 650 nm, and 930 nm can be used. In accordance with an exemplary embodiment, for example, the sensor 114 can have a cosine corrected diffuser such that sunlight radiation from different angles is detected correctly. In an alternative exemplary embodiment, rather than a separate radiance sensor 114, the radiance sensor 114 can be configured as part of the camera 112 using a light guide or optical fiber 115 (FIG. 5). In accordance with an exemplary embodiment, the light guide or optical fiber 115 receives the sunlight and conveys the light to the camera 112, which can record the data from the guide or fiber for use in calibrating the multispectral images as disclosed herein.

Figure 2A:
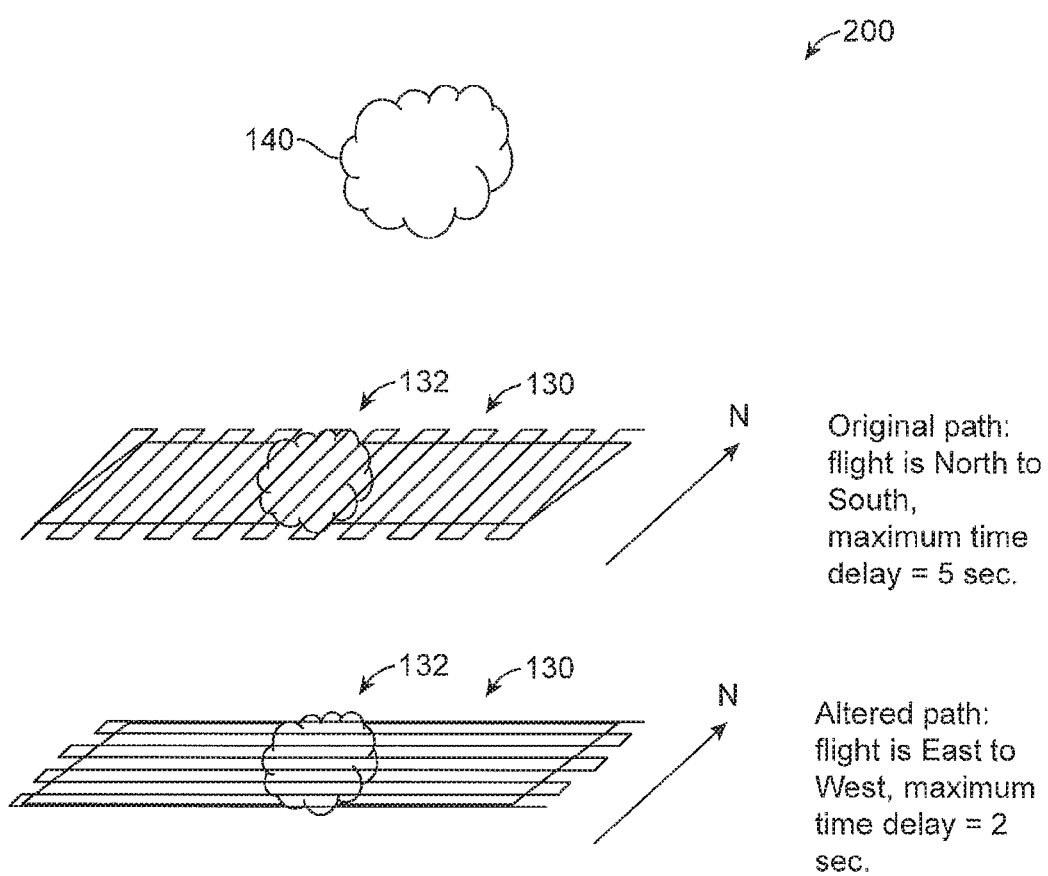
FIG. 2A is an illustration of exemplary flight paths for an aerial vehicle in accordance with an exemplary embodiment.

FIG. 2A is an illustration of exemplary flight paths 200 for an aerial vehicle 110 in accordance with an exemplary embodiment. As shown in FIG. 2A, for example, a cloud 140 can be detected in the field of view of the multispectral camera 112 and/or the solar radiation sensor 114 by monitoring the intensity level. Once a cloud 140 is detected, several actions may occur. For example, the first action can be to use a time delayed or previous calibration value from the solar radiation sensor 114 or data from the white area intensity image. By doing so, the system 100 can use the same data obtained based on a position or location, since an airplane flies at higher altitude, and the actual position of calibration data and image data can be different unless the sun is at a zenith. In addition, the positioning of the sun at the zenith is a relatively rare case because it occurs at solar noon when the sun declination angle equals the latitude where imaging is occurring and the aerial vehicle is not tilted. The second action can be to change the direction of flight of the aerial vehicle 110 to image the field to reduce the impact from the cloud shadow. For example, if the aerial vehicle 110 is flying north to south, the direction could be changed to east to west.

Figure 2B:
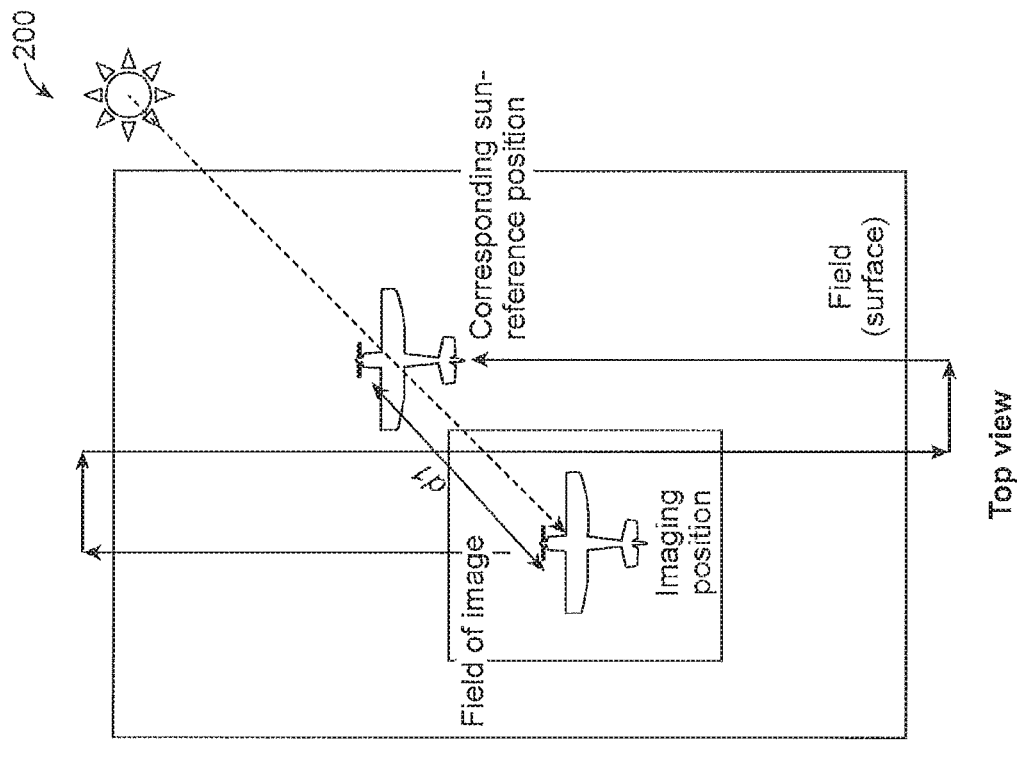
FIG. 2B is an illustration of the relationship between imaging and sun referencing position for a non-optimum route with a long time difference.
Figure 2B:
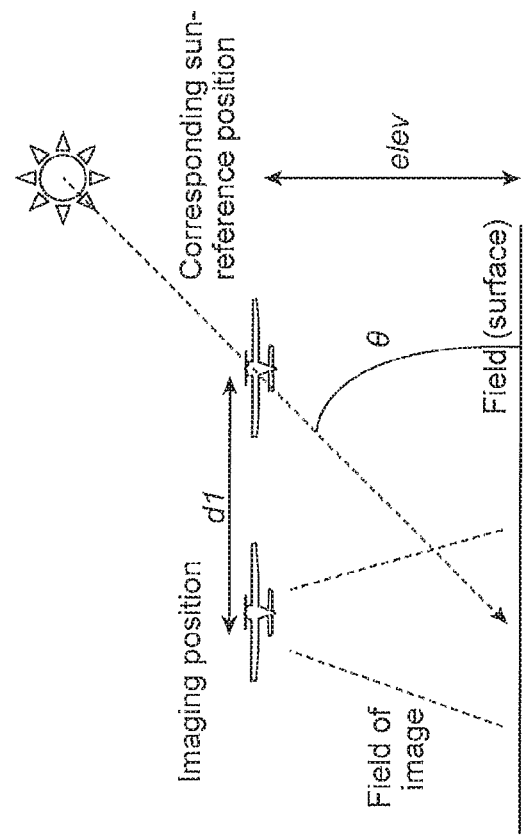

FIG. 2B are schematic diagrams showing how to adjust the timing of imaging and reference data. For example, by knowing the angle of the sun (from zenith and the direction angle) and the height from the surface and position of image capturing and sun-referencing. Image data and sun-referencing data can include position data and for an imaging position, sun-referencing data at the nearest appropriate position can be chosen and used as compensation. To calculate the sun elevation angle, it is necessary to know the sun declination, the local latitude, and the solar hour. For example, the formula for calculation of the sun elevation angle is as follows:

$$\theta = \sin^{-1}(\cos h * \cos \delta * \cos \varphi + \sin \delta * \sin \varphi)$$

where θ is the sun elevation angle, h is the hour angle in the local solar time, δ is the current declination of the sun, and φ is the local latitude. Once the sun elevation angle has been calculated, the following formula can be used to calculate the distance between the imaging position and the corresponding sun reference position as follows:

$$d1 = \text{elev}/\tan \theta$$

where d1 is the distance between the imaging position and the corresponding sun reference position, elev is aerial vehicle elevation measured in meters above ground level (AGL) and θ is the sun elevation angle.

For example, as shown FIG. 2B, when the flight route is not parallel to the line connecting aerial vehicle and the sun, and it can necessitate a long time difference between the time the surface image is taken and sun-reference data. For example, it may take more than 1-2 minutes because of the scanning route.

Figure 2C:
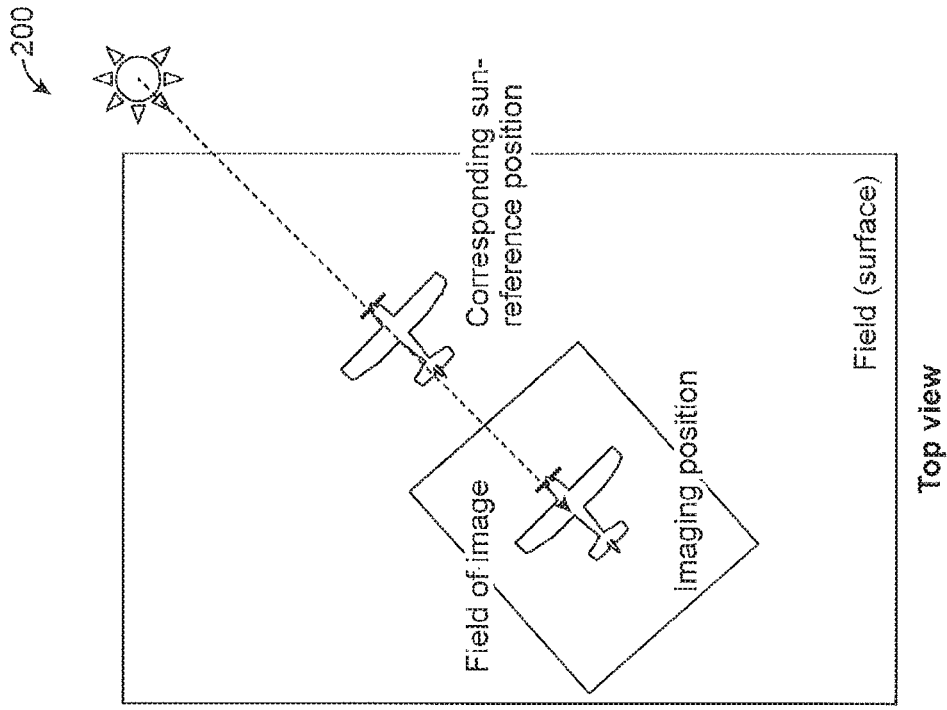
FIG. 2C is an illustration of the relationship between imaging and sun referencing position for an optimum route with a short time difference.
Figure 2C:
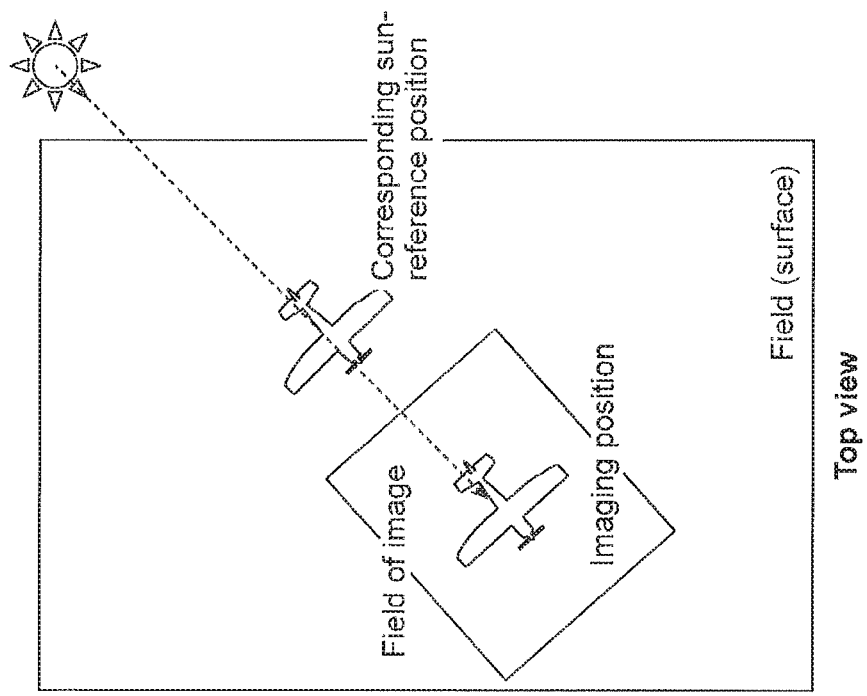

FIG. 2C shows a flight route, which is parallel to the line connecting aerial vehicle and the sun. In such case, the time difference is minimized and may be several seconds. When the fields of images are overlapping each other, this simple method can be used in the situation of clear sky, scattering cloud, haze conditions, etc.

Figure 3:
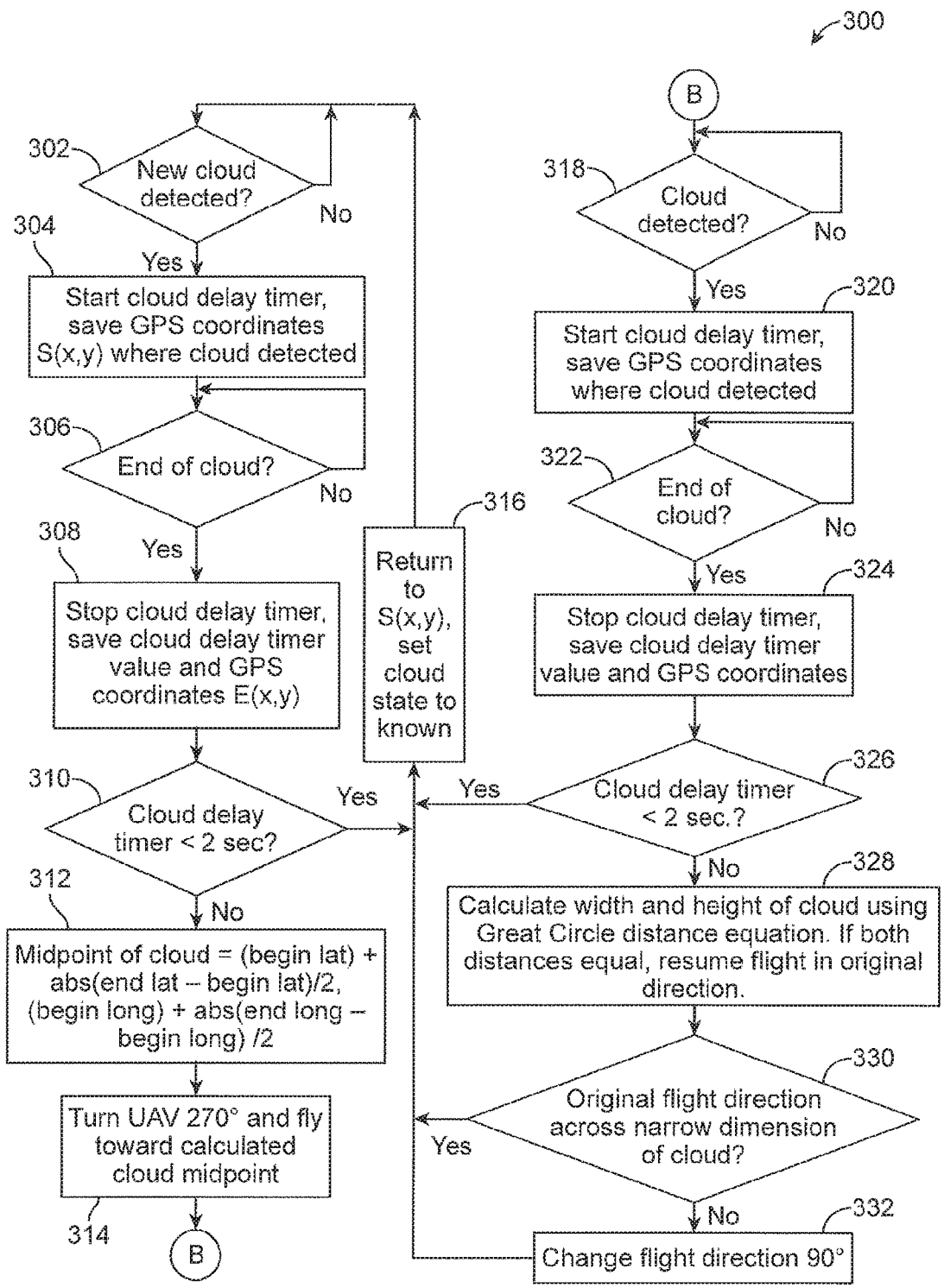
FIG. 3 is a flowchart for an algorithm for determination of a flying direction for an aerial vehicle in accordance with an exemplary embodiment.

FIG. 3 is a flowchart 300 for an algorithm for determination of a flying direction for an aerial vehicle in accordance with an exemplary embodiment. As shown in FIG. 3, in step 302, the system 100 determines if a new cloud 140 has been detected. If no new clouds 140 have been detected the algorithm returns to a start position, and repeats the process. If a new cloud 140 is detected in step 302, the process continues to step 304, where the system 100 starts a cloud delay timer, and stores the GPS coordinates (S(x,y)), where the beginning of the cloud 140 was detected. In step 306, the system 100 can determine, if the end of the cloud 140 has been detected. If the end of the cloud 140 has not been detected, the system 100 continues to monitor the existence of the new cloud 140. If the end of the cloud 140 as been detected, in step 308, the system 100 activates, the stop cloud delay timer, which indicates that the end of the cloud 140 has been detected, and the corresponding cloud delay timer value and GPS coordinates (E(x,y)) are recorded. For example, in accordance with an exemplary embodiment, in the case where several clouds 140 are detected on a field, the flight direction can be set so that the combination of the clouds will have the minimum impact on the time delay by summing the time delay for the original flight direction vs. the time delay in the perpendicular flight direction.

In step 310, a determination is made, if the cloud delay time, for example, is less than 2 seconds, the process continues to step 316, where the process returns to "S(x,y), set cloud state to known" and the process returns to the step 302. If the cloud delay timer, for example, is not less than 2 seconds (<2), the process continues to step—ein the midpoint of the cloud is determined using the equation of "Midpoint of cloud=(begin lat)+abs(end lat−begin lat)/2, (begin long)+abs(end long−begin long)/2". In step 314, the process instructs the aerial vehicle to turn 270° and fly toward calculated midpoint of the cloud. In step 318, a determination can be made if a cloud 140 is detected. If no cloud 140 is detected, the process returns to step 318 until a cloud 140 is detected. If a cloud 140 is detected, the process continues to step 320, where the system 100 is instructed to "start cloud delay timer, and save GPS coordinates where cloud detected." The process continues to step 322, where a determination be made if the end of the cloud 140 has been reached or not. If the end of the cloud 140 has not been reached, the process continues back to step 322 until the end of the cloud 140 has been reached. Once the end of the cloud 140 has been reached, the process continues to step 324, where the system 100 instructed to "stop cloud delay timer, save cloud delay timer value and GPS coordinates."

In step 326, determination is made if the cloud delay time is, for example, less than 2 seconds, the process continues to step 316, where the process returns to "S(x,y), set cloud state to known". If the cloud delay timer is, for example, not less than 2 seconds (<2 seconds), the process continues to step 328, where the width and height of the cloud 140 can be calculated using the Great Circle distance equation. In accordance with an exemplary embodiment, If both distances are equal, the flight resumes in original direction.

In accordance with an exemplary embodiment, the Great Circle distance equation can be used to calculate distances from ending and starting GPS coordinates because the distances between two points on the surface of the earth is not a straight line but is two points on an approximately spherical shape.

The Great Circle distance equation is as follows:

$$d = R1 * 2 * \sin^{-1} \sqrt{\left(\frac{\sin(abs(D2-D1))}{2}\right)^2 + \cos(D1)^* \cos(D2)^* \left(\frac{\sin(abs(L2-L1))}{2}\right)^2}$$

where d is distance between two points, R1 is the mean radius of the earth (6371 km or 3958.7 statute miles), D1 is starting GPS latitude, D2 is ending GPS latitude, L1 is starting GPS longitude, and L2 is ending GPS longitude. If GPS coordinates are in degrees minutes and second format such as 37:24'51", the coordinates should be converted to decimal format by $$d2 = deg + \frac{m}{60} + \frac{s}{3600}$$

where d2 is converted decimal value, deg=GPS coordinate degrees, m is GPS coordinate minutes, and s is GPS coordinate seconds before calculating distance using the Great Circle distance equation.

Alternatively, if GPS coordinates are in format DDD MM.MMMM where DDD is N for Northern Hemisphere, S for Southern Hemisphere, W for West of Prime Meridian, and E for East of Prime Meridian and decimal degrees 0-180, and MM.MMMM is minutes (00.0000 to 59.9999), convert to decimal format by conversion of N or E to positive, S or W to negative, dividing minutes by 60 and dividing the fractional portion of the minutes by 60000. For example, N37 17.477 would become: 37+17.477/60=37+ 0.291283=37.291283.

In step 330, determination can be made if the original flight is across the narrow dimension of the cloud 140. If the flight is across the narrow dimension of the cloud, the process goes to step 316. If the flight is not across the narrow dimension of the cloud, the flight direction of the aerial vehicle can be changed by approximately 90°.

Figure 4:
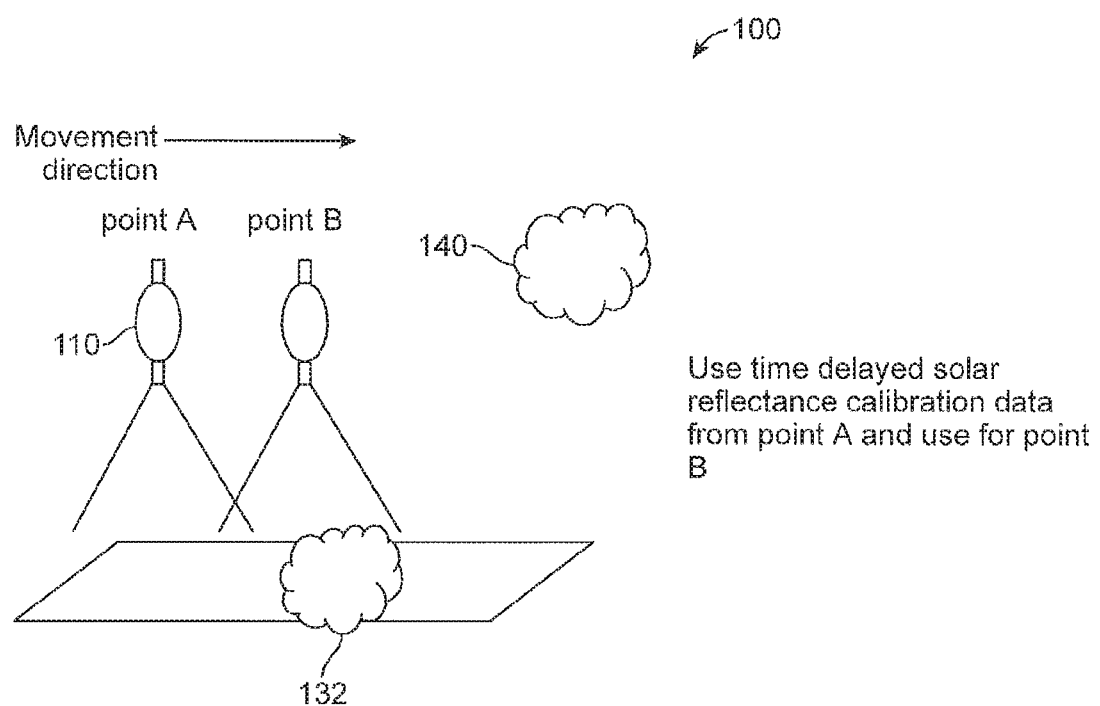
FIG. 4 is an illustration of an aerial vehicle in operation in accordance with an exemplary embodiment.

FIG. 4 is an illustration of an aerial vehicle 110 in operation in accordance with an exemplary embodiment. As shown in FIG. 4, the solar radiation sensor 114 takes a snapshot of solar radiation at point A and multispectral camera 112 is calibrated based on the solar radiation and estimated sun position. The aerial vehicle 110 can be manually directed to fly in the direction of the sun. At point B, the solar radiation sensor 114 again takes a snapshot of the solar radiation. When the second snapshot of solar radiation is captured, the sun position (zenith angle and elevation angle) can be estimated based on the first calibration. By doing so, the time delay can be minimized, which can lead to a method and system having improved or higher accuracy.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. The present disclosure includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to".

In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present disclosure" or "disclosure" may be used as a reference to one or more aspect within the present disclosure. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A method of calibrating multispectral images from a camera on an unmanned aerial vehicle, the method comprising:
   capturing multispectral images of an area of land at a plurality of intervals with a multispectral imaging camera;
   simultaneously capturing sunlight radiance data for each of the captured images with a solar radiance sensor mounted on an upper portion of the unmanned aerial vehicle and monitoring an area above the unmanned aerial vehicle;
   correlating the images with the sunlight radiance data;
   calibrating the multispectral images based on the sunlight radiance data to normalize the multispectral images to one or more previous images of the area;
   monitoring an intensity level of the sunlight radiance data for detection of one or more clouds; and
   changing the direction of flight of the unmanned aerial vehicle to reduce an impact of shadows from the one or more clouds.

2. The method of claim 1, comprising:
   georeferencing each of the captured images using a positioning system.

3. The method of claim 1, comprising:
   storing the multispectral images in bands, each band representing a wavelength of light.

4. The method of claim 1, comprising:
   adjusting the multispectral images using a calibration curve based on the sunlight radiance data.

5. The method of claim 4, wherein the calibration curve is a linear curve.

6. The method of claim 4, wherein the calibration curve is a non-linear curve.

7. The method of claim 1, comprising:
   implementing a time delay calibration value, wherein the time delay calibration comprises:
      obtaining first solar radiation data at a first point;
      flying the unmanned aerial vehicle into a direction of the sun and obtaining second solar radiation data at a second point; and
      calibrating the multispectral imaging camera based on the first and second solar radiation data and an estimated sun position based on the first solar radiation data.

8. A system for calibrating multispectral images from a camera on an unmanned aerial vehicle, the system comprising:
   the unmanned aerial vehicle configured to:
      capture multispectral images of an area of land at a plurality of intervals with a multispectral imaging camera;
      simultaneously capture sunlight radiance data for each of the captured images with a solar radiance sensor mounted on an upper portion of the unmanned aerial vehicle and monitoring an area above the unmanned aerial vehicle; and
   a computer configured to:
      correlate the images with the sunlight radiance data;
      calibrate the multispectral images based on the sunlight radiance data to normalize the multispectral images to one or more previous images of the area;
      monitor an intensity level of the sunlight radiance data for detection of one or more clouds; and
      change the direction of flight of the unmanned aerial vehicle to reduce an impact of shadows from the one or more clouds.

9. The system of claim 8, wherein the unmanned aerial vehicle georeferences each of the captured images using a positioning system.

10. The method of claim 8, wherein the unmanned aerial vehicle is configured to store the multispectral images in bands, each band representing a wavelength of light.

11. The system of claim 8, wherein the computer is configured to:
   adjust the multispectral images using a calibration curve based on the sunlight radiance data.

12. The system of claim 11, wherein the calibration curve is a linear curve.

13. The system of claim 11, wherein the calibration curve is a non-linear curve.

14. The system of claim 8, wherein the unmanned aerial vehicle is configured to:
   detect the one or more clouds by monitoring an intensity level of the sunlight radiance data; and
   implement a time delay calibration value, wherein the time delay calibration comprises:
      obtaining first solar radiation data at a first point;
      flying the unmanned aerial vehicle into a direction of the sun and obtaining second solar radiation data at a second point; and
      calibrating the multispectral imaging camera based on the first and second solar radiation data and an estimated sun position based on the first solar radiation data.

* * * * *